July 24, 1923.
J. H. WATSON
1,462,528
VARIABLE SPEED TRANSMISSION GEAR
Filed June 3, 1922
4 Sheets-Sheet 3
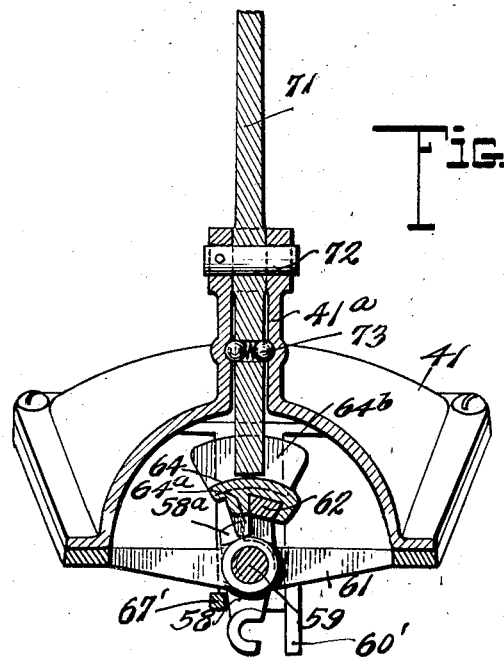
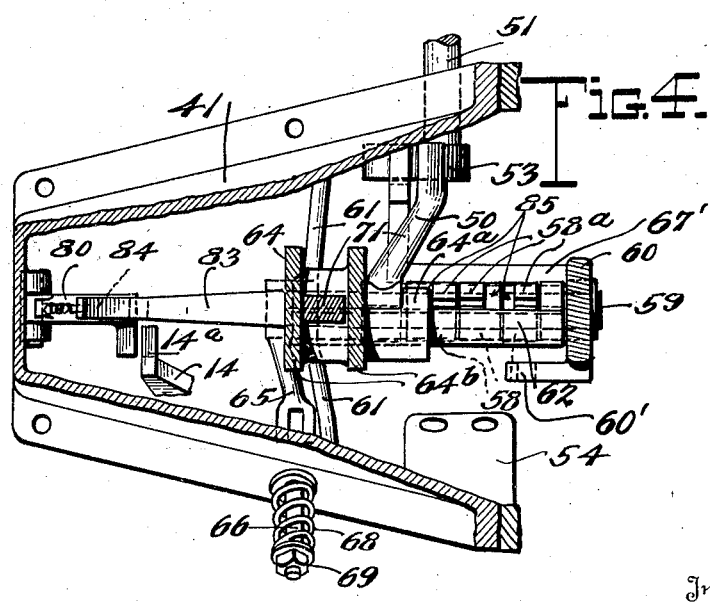
Inventor
James H. Watson July 24, 1923.
J. H. WATSON
VARIABLE SPEED TRANSMISSION GEAR
Filed June 3, 1922
1,462,528
4 Sheets-Sheet 4
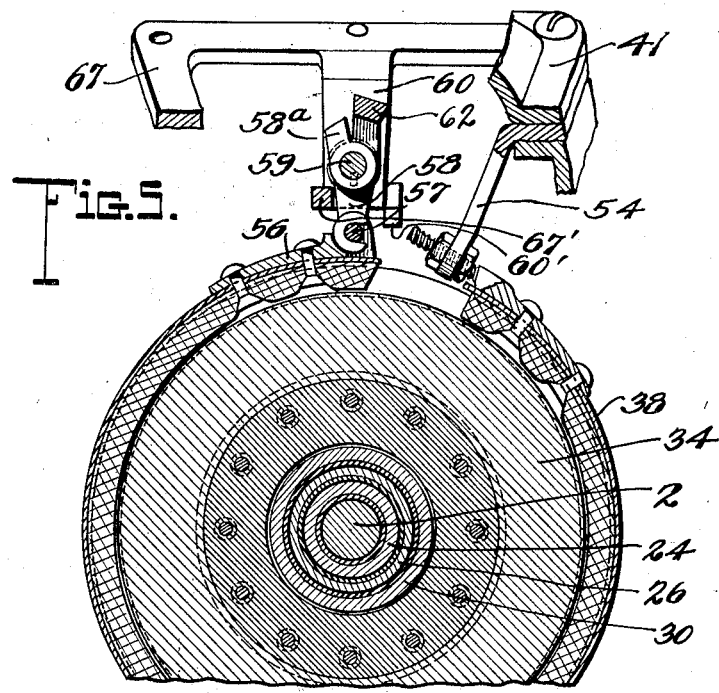
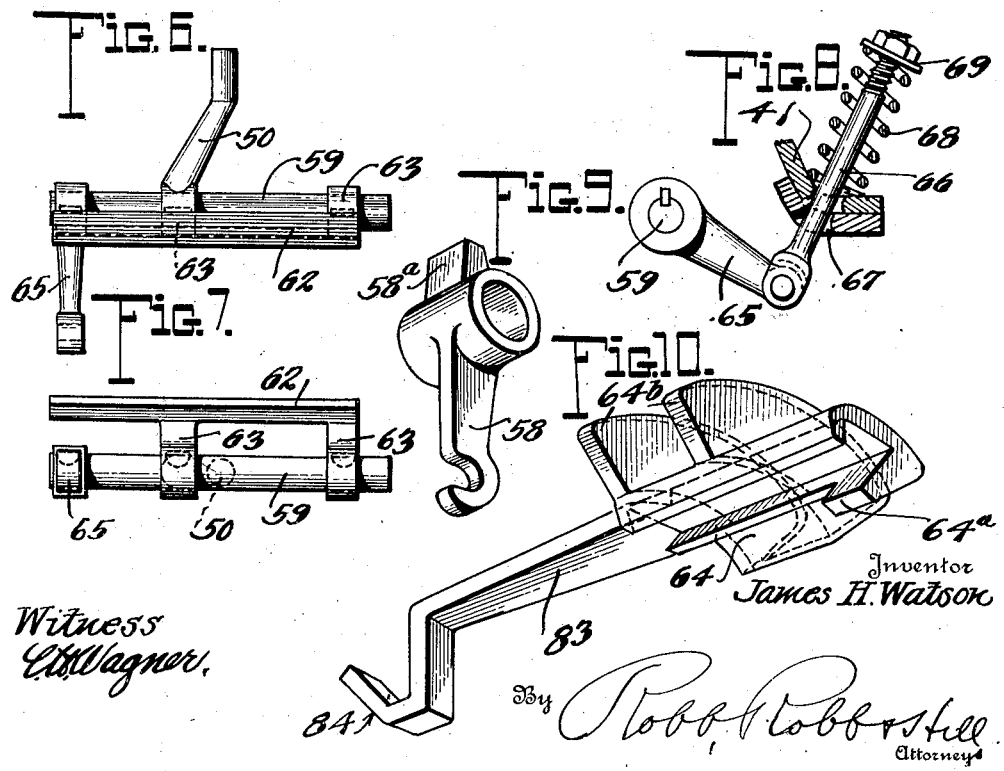

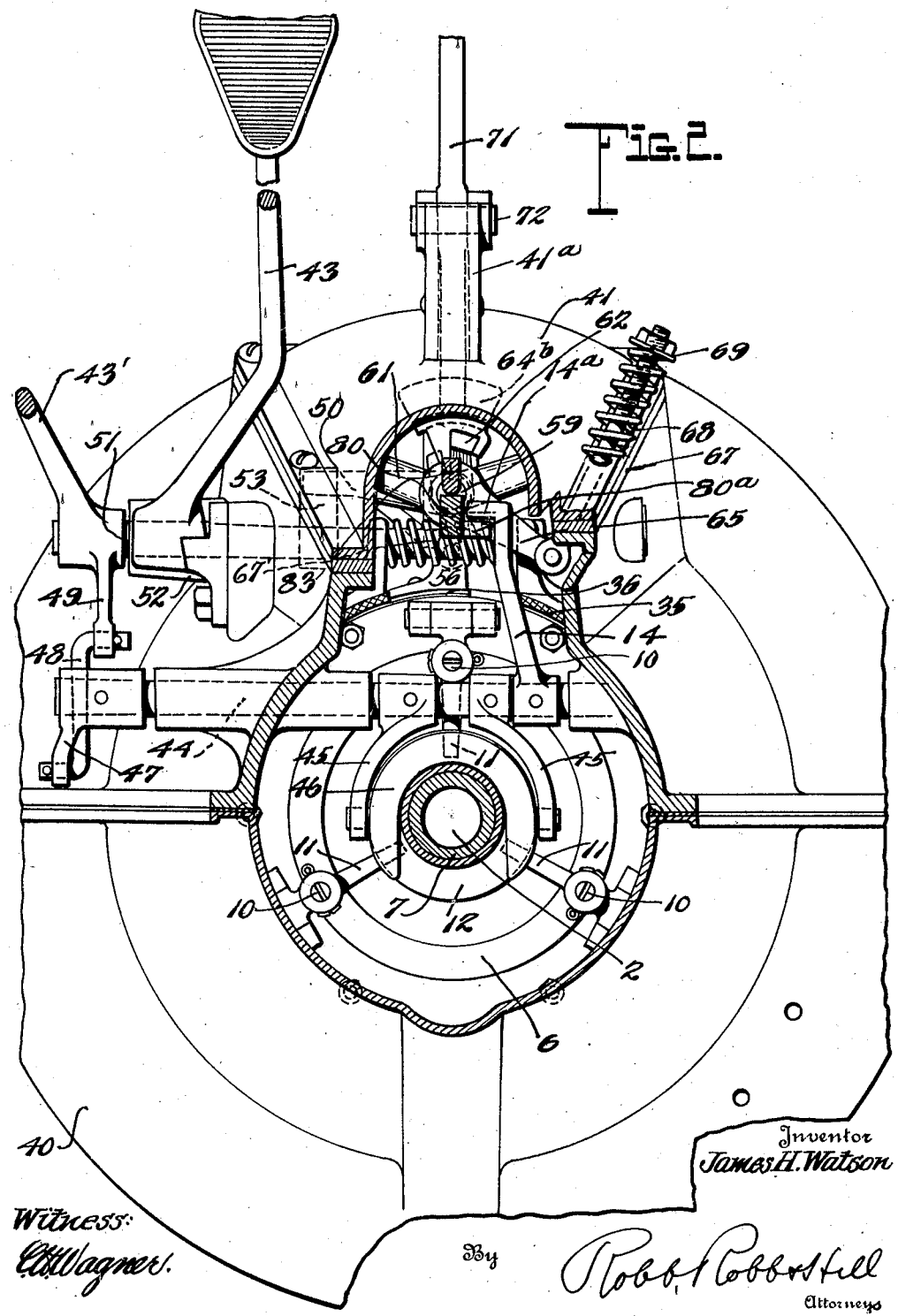

Patented July 24, 1923.

1,462,528

UNITED STATES PATENT OFFICE.

JAMES H. WATSON, OF RIVERTON, WYOMING, ASSIGNOR OF ONE-HALF TO F. CHATTERTON, OF RIVERTON, WYOMING.

VARIABLE-SPEED TRANSMISSION GEAR.

Application filed June 3, 1922. Serial No. 565,514.

*To all whom it may concern:*

Be it known that I, JAMES H. WATSON, a citizen of the United States, residing at Riverton, in the county of Fremont and State of Wyoming, have invented certain new and useful Improvements in Variable-Speed Transmission Gears, of which the following is a specification.

The present invention relates in general to certain new and useful improvements in variable speed transmission gears of that general type which are utilized in the construction of motor vehicles for transmitting power from the engine shaft to the drive wheels at different speed ratios which are selectively controlled by the driver of the vehicle.

The invention relates more particularly to variable speed transmission gears which are of the planetary type, and among the objects of the invention is to provide a planetary type of transmission gearing embodying novel features of construction, whereby three or more forward speeds and a reverse speed are obtainable.

A further object of the invention is to provide a construction of this character which can be readily combined with or embodied in a conventional Ford type of planetary transmission gearing, and which will modify the action thereof, so that it is possible to obtain three forward speeds instead of the usual two forward speeds.

Further objects of the invention are to provide a device of this character which is comparatively simple and inexpensive in its construction, which is positive and dependable in its action, and which enables a two forward speed Ford type of planetary transmission gear to be readily transformed into a three forward speed transmission gear device at a nominal expense and without weakening the parts.

For the purpose of illustrating the general idea of the invention, I have illustrated and described one particular embodiment thereof in detail, although it will be understood that many modifications and changes can be made in the details of construction without departing from the spirit of the invention and within the scope of the claims of the patent.

For a full understanding of the construction and manner of operation of that form of the invention which I have elected to disclose in this application, reference is to be had to the following description and accompanying drawings, in which:

Figure 2 is a transverse sectional view through the upper portion thereof, illustrating certain features of the control mechanism, and taken approximately on the plane indicated by line 2—2 of Figure 1.

Figure 3 is a fragmentary sectional view taken approximately on the line 3—3 of Figure 1 looking in the direction of tne arrows.

Figure 4 is a horizontal sectional view taken approximately on the plane indicated by the line 4—4 of Figure 1.

Figure 5 is a vertical sectional view taken approximately on the plane of the line 5—5 of Figure 1.

Figure 6 is a detail plan view of the connection of the control lever transmission band actuating means.

Figure 7 is a side elevation of the parts shown in Figure 6.

Figure 8 is a detail view partly in section of the transmission band tensioning means.

Figure 9 is a detail perspective view of one of the band actuating arms.

Figure 10 is a detail perspective view of the selector element for the transmission.

Corresponding and like parts are referred to in the following description and indicated on all of the views of the drawings by like reference characters:

Figure 1:
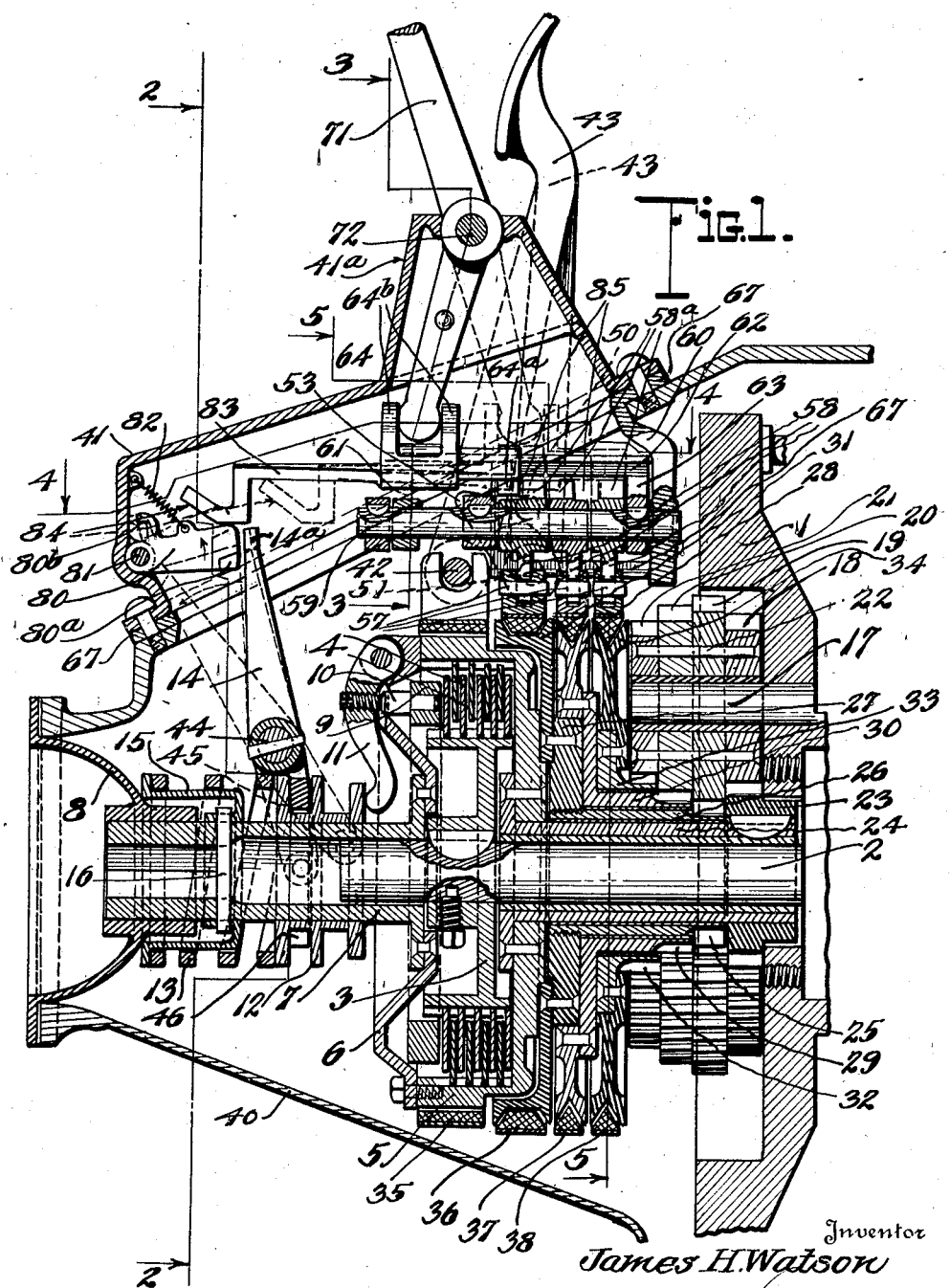
Figure 1 is a longitudinal sectional view through a planetary type of variable speed transmission gearing constructed in accordance with the invention.

Referring to the drawings, the numeral 1 designates the fly wheel which is rigidly secured to a transmission gear shaft 2, which is of the conventional construction, said fly wheel being adapted to be connected directly with the crank shaft of the engine so as to rotate therewith. The transmission gear shaft 2 has the disc drum 3 keyed to the end portion thereof. A series of clutch discs 4 which are of the conventional construction are interposed between this disc drum 3 and a brake drum 5, and when these clutch discs are in operative engagement with each other the disc drum 3 and brake drum 5 are locked together, so that they rotate in unison, while when the clutch discs are inoperative the brake drum 5 can rotate independently of the disc drum. The brake drum has the driving plate 6 rigidly secured thereto, said driving plate carrying a tubular shaft 7, having a polygonal socket in the rear end thereof, which is adapted to engage with the forward end of the main drive shaft, a hollow shell 8 being shown as provided to receive the usual universal joint with which the drive shaft is ordinarily provided.

The clutch discs 4 are interposed between the web portion of the brake drum 5 and a clutch push ring 9, said push ring being formed with laterally projecting stem portions 10 which extend loosely through openings in the driving plate 6 and are engaged by clutch fingers 11. The inner ends of the clutch fingers are engaged by a clutch shift 12, which is slidable upon the hollow shaft 7, and which is adapted to be moved against the action of the clutch spring 13 by means of a yoke 46. The clutch spring abuts against a thrust ring 15, which is held in position in any suitable manner as by means of a transverse pin or key 16. When the yoke 46 is manipulated to slide the shifting member 12 against the action of the spring 13, the clutch fingers 11 are released and the two sets of clutch discs 4 separate from each other, so that the driving connection between the disc drum 3 and the brake drum 5 is broken. However, the spring 13 normally tends to slide the shifting member 12 toward the driving plate 6, with the result that the clutch fingers act upon the plungers 10 to slide the push ring inwardly, and the two sets of clutch discs are brought into a frictional engagement with each other, so that the brake drum 5 is locked with the disc drum 3 and a direct driving connection is established between the fly wheel and the tubular shaft 7 of the driving plate.

The fly wheel 1 is provided at intervals with stub shafts 17 upon which clusters of gears are mounted. In the present instance each of these clusters comprises the gears 18, 19, 20 and 21, all of the gears being of different sizes, and the gears of each cluster being rigidly connected with each other in some suitable manner as by means of the pins or tie members 22. There are ordinarily three of these clusters of gears which are arranged at equal distances apart, upon the fly wheel, although it will be obvious that a greater or less number of these clusters may be used, if desired. The gears 18, 19 and 21 of each of the clusters correspond to the three gears which are now used in the well known Ford type of transmission gearing, although the gear 20 is an additional gear which is intermediate in size between the gears 18 and 19, and cooperates with other associated parts to give an additional forward speed which is somewhat lower than the usual low speed.

The gear wheels 18 of the several clusters mesh with a pinion 23 which is keyed upon the end of a bushing 24, said bushing surrounding the shaft 2 and being rigidly connected with the hub portion of the brake drum 5. The gears 20 of the several clusters mesh with a pinion 29 upon the end of a bushing 30, which is rigidly secured in any suitable manner to the hub portion 27 of a low speed brake drum 28. In a similar manner the gears 19 of the several clusters of gears mesh with teeth 25 at the end of a bushing 26, which is rigidly secured in any suitable manner to the intermediate speed brake drum 31. The gears 21 of the clusters of gears mesh with teeth 32 upon bushing 33, which is rigid with the reverse drum 34. The brake drum 5 and the bushing associated therewith is identical with the brake drum and bushing used in the conventional Ford type of transmission gearing, although the other brake drums have been made narrower in order to assemble the three drums in the space ordinarily occupied by the two drums of the Ford transmission, and the bushings have been correspondingly modified so that they can be assembled in a nested relation to each other and the teeth or pinions at the ends thereof will mesh properly with the corresponding gears of the clusters of gears on the fly wheel.

Brake bands 35, 36, 37 and 38 are provided for the respective drums 5, 28, 21 and 34, and these brake bands are all normally loose, although they are adapted to be selectively tightened around the corresponding drums in order to control the proper operation of the mechanism. When the brake bands 36, 37 and 38 are loose and the disc clutch 4 is closed, there is a direct driving connection through the mechanism from the fly wheel to the driving plate 6 and shaft 7, and this relation exists when the highest possible speed is desired. When the clutch is released the brake band 35 can be used as a service brake. With the clutch in an open position, any one of the brake bands 36, 37 or 38 can be tightened and the corresponding brake drum locked against rotation, in order to get a variable speed transmission between the fly wheel and the drive shaft of the vehicle.

When the brake band 37 is tightened the low speed drum 28 is locked against rotation. This means that the pinion 29 is held against rotation, and that the several clusters of gears which are carried by the fly wheel revolve about this pinion 29 and in turn drive the pinion 23 and the drum 5 which is rigid therewith. The ratio between the gears which are then operative is such that a slow forward speed is obtained. If the brake band 36 is tightened the toothed element or pinion member 25 is held stationary, so that the gears 19 of the clusters of gears revolve around the same. The ratio existing between the gears 19 and pinions 25 is different, however, from the ratio existing between the gears 20 and the pinions 29 so that a different speed is obtained. The speed which is obtained when the brake bands 36 are tightened is a forward speed which is faster than the slow speed previously mentioned, but which is not as fast as the high speed, being what is generally termed an intermediate speed. When the brake band 38 is tightened the toothed element or pinion 32 is held stationary so that the gears 21 of the clusters of gears revolve around the same, and the ratio between these gear elements is such that a reverse speed is then obtained. These speeds are all obtained by the well known action of the planetary type of transmission gearing, and the manner of operation will be quite clear from the explanation which has been given.

Owing to the fact that the drums 31 and 34 are only about one-half of the width of the brake drums of the standard Ford transmission, the brake bands 37 and 38 are given a V shaped cross section so that they may frictionally engage the same over the necessary area to act in the proper manner. The brake band 36 also has a semi V shaped cross section for the same purpose. These brake bands are adapted to be selectively controlled by a special mechanism which is so designed that it can be readily mounted upon the transmission casing of a conventional Ford type of gear, taking the place of the usual cover plate.

The transmission mechanism is enclosed within the usual casing 40 which may, if desired, be formed in upper and lower sections for convenience in assembling the same. The top of the casing is provided with the usual opening, and a special cover plate 41 which has a concave or hollow formation and carries the gear shifting lever, together with a plate 67 supporting a number of the associated control elements, are substituted for the usual flat cover plate of the well known Ford transmission. A shaft 42 extends transversely through the casing, being suitably journaled therein, and is operatively connected in the usual manner to the ends of the brake band 35 which surrounds the brake drum 5. A foot pedal 43 is connected in the usual manner to the shaft 42 and provides a means for controlling the service brake while driving the vehicle.

Another shaft 44 extends transversely through the casing 40, said shaft having an upwardly extending clutch control lever 14 rigidly applied thereto, and being provided with downwardly extending arms 45 which are operatively connected in the usual manner to the yoke 46 of the shifter 12. One end of the shaft 44 extends beyond the side of the casing where it is provided with an arm 47, which is connected in the usual manner by means of a link 48 to an arm 49 at the lower end of a clutch pedal 43'. This clutch pedal 43' is rigid with a shaft 51 which is journaled within a suitable bushing 52, and which is provided at its inner end with a cam 53, said cam operating through mechanism which will be hereinafter described, to automatically release any one of the brake bands of the planetary gearing which may have been tightened when the clutch pedal is pushed forward to open the clutch.

Projecting from the plate 67, downwardly within the casing from one side of the opening in the top thereof is a bracket 54 which has the fixed ends of the brake bands 36 and 37 anchored thereto in some suitable manner as indicated at 55. The opposite ends of the said brake bands are provided with terminal members 56 provided with pins 57 which are engaged by the hooked lower ends of corresponding arms 58, said arms being loosely mounted upon a shaft 59 which is supported from the plate 67 and which extends parallel to the transmission shaft 2. In the present instance this shaft 59 is mounted upon the bracket members 60 and 61 which project from the plate 67. The arms 58 are provided at their upper ends with fingers 58$^a$ which are adapted to be selectively engaged by a suitable actuating element for the purpose of swinging one of the arms to tighten the corresponding brake band and cause the planetary gearing to operate in the desired manner. The plate 67 includes a stop bracket 67' limiting the movement of the arms 58.

Arranged parallel with the shaft 59 is a guide bar 62 which is carried by arms 63 projecting from and rigidly connected to the shaft 59. The guide bar 62 is thus mounted to rotate bodily around the shaft 59 and a selector element 64 is slidably mounted upon the guide bar 62, being formed with a depending finger 64$^a$ which is adapted to engage the finger 58$^a$ of a selected one of the arms 58, for the purpose of swinging the said arm to tighten the brake band upon the brake drum.

An actuating arm 65 is rigidly applied to the shaft 59 and pivotally connects at its outer end with a plunger 66 which extends upwardly through guide openings in the plate 67 and the transmission cover 41. Surrounding the plunger 66 is a heavy coil spring 68, which is interposed between the cover 41 and a nut or abutment 69 on the upper end of the plunger. The action of this spring normally tends to rotate the shaft 59 in such a direction as to tighten one of the brake bands of the planetary system of gearing, provided the selector element 64 has been so positioned upon the guide bar 63 that the depending finger 64ª thereof will engage the finger 58ª of one of the arms 58.

The shaft 59 also has a control lever 50 rigidly applied thereto. This control lever extends into cooperative relation with the cam element 53 of the clutch pedal shaft 51, and the relation between the parts is such that when the clutch pedal is pushed forwardly to open the clutch the cam element 53 engages the lever 50 and swings the same in such a direction as to rotate the shaft 59 against the action of the spring 68. As soon as the clutch pedal is released the shaft 59 will be rotated back into its original position by the action of the said spring 68.

A lever 71 is provided for sliding the selector element 64 on the guide bar 62 and properly positioning it thereon in the necessary manner for the selective control of the system of planetary gearing. The lever is pivoted at 72 within an upwardly extending portion 41ª of the hollow cover plate 41, and the lower end of the lever is received between a pair of transversely extending flanges 64ᵇ which project upwardly from the selector element 64. The said selector element is thus permitted to swing laterally when the guide bar 62 is rotated about the shaft 59 as an axis, although it always remains in operative engagement with the lever 71, so that it can be moved back and forth upon the guide bar by suitably manipulating the lever. For the purpose of facilitating the proper adjustment of this selector member, the portion of the lever 71 which is received within the upwardly extending portion 41ª of the hollow cover plate 41 may be provided with a spring detent 73 arranged to be seated successively in depressions 74 in the inner face of the part 41ª of the casing cover. The cooperation between this spring detent and the several depressions or seats will serve in a well known manner to momentarily arrest the lever at the different points in its movements, and enable the driver of the vehicle to tell by the feel of the lever when it is properly positioned.

The upper extremity of the lever 14 of the clutch control device is provided with a laterally projecting lug 14ª which is adapted to cooperate with a corresponding lug 80ª on a detent 80 which is pivoted at 81 in one end of the hollow cover plate 41. The lugs 14ª and 80ª may be correspondingly beveled so that when the lever 14 is swung rearwardly incident to the opening of the clutch the engagement of the beveled faces will swing the detent 80 downwardly against the action of the spring 82 until the lugs clear each other and the detent is swung upwardly by the action of the spring, thereby causing the lugs to interlock in such a manner as to lock the clutch in an open position. It will be understood that with this form of planetary gearing the clutch must be open at all times except when there is a direct drive from the engine shaft to the drive shaft and the device is set for high speed transmission. The clutch must be locked in an open position when the device is adjusted to transmit power at the other speeds.

The selector element 64 is provided with a rearwardly projecting extension 83 which terminates in a beveled nose 84. When the selector element is moved into the proper position for setting the mechanism for a high speed transmission, the bevel nose 84 of the extension 83 engages the detent 80 and swings the same downwardly against the action of the spring 82, thereby releasing the lever 14 if the same had been previously engaged, and preventing engagement of this lever in its back and forth movements by the detent as long as the detent is held in a depressed position by the cam nose of the extension 83. As soon as the gear shifting lever 71 is moved to slide the cam nose 84 away from the detent 80 the latter will be immediately returned to operative position by the tension of the spring 82. In this connection it may be noted that the detent 80 is provided with a stop member 80ᵇ which limits the upward swinging movement thereof and holds it in proper position for cooperative engagement with the lever 14.

It will be noted that the control mechanism is mounted upon the plate 67 which is positioned between the cover member 41 and the case so that they can be readily applied as units to the casing of the conventional Ford mechanism by substituting the supporting plate and cover for the usual flat cover plate of the Ford mechanism. The mechanism is controlled by the clutch pedal 43', the service brake pedal 43 and the gear shifting lever 71. If the device is applied as an attachment to the usual Ford transmission device, the "reverse" foot pedal thereof is omitted and the end of the reverse band 38 is fastened to the bracket 60' projecting from the bracket 60 which depends from the plate 67.

The brake pedal 43 is employed for controlling the service brake in the usual manner, and in order to shift gears it is necessary to first open the clutch by manipulation of the clutch pedal 43' and to then manipulate the gear shifting lever 71 to move the selector element 64 into the desired position. The movement of the clutch pedal to open the clutch operates, as has been heretofore explained, to rotate the cam 53 and swing the lever 50, thereby rocking the shaft 59 against the action of the spring plunger 66 and swinging the guide bar 63 of the actuating element laterally. The selector 64 can then be moved longitudinally on the guide bar 63 until the finger 64ª thereof is in position to engage the finger 58ª of any one of the arms 58. Upon the release of the clutch pedal the spring actuating plunger 66 rocks the shaft 59 back to its original position and the guide bar 63 is swung bodily about the shaft, carrying the selector element 64 with it. If the finger 64ª thereof has been positioned for engagement with the finger 58ª of one of the arms 58, the corresponding brake band 36, 37 or 38 will be tightened upon its drum, with the result that power will be transmitted through the mechanism at the corresponding speed. The movement of the clutch pedal to open the clutch will, of course, have brought the lever 14 into operative engagement with the detent 80, so that the clutch will be locked in an open position while the planetary system of gearing is in operation. The reverse speed is obtained when the mechanism is set to tighten the brake band 38, while the two forward speeds, independent of the direct drive, are obtained by a tightening of the brake band 36 or the band 37.

When the gear shifting lever 71 is in a neutral position the finger 64ª of the selector element 64 is positioned in a space 85 which is provided between the fingers 58ª of the arms 58 for the brake bands 37 and 38, respectively. When the gear shifting lever 71 is in proper position for a high speed transmission, the downwardly projecting finger 64ª of the selector element 64 is not in position to engage any of the fingers 58ª of the arms 58, although the selector element is moved into such a position that the cam nose 84 of the extension 83 thereof is in engagement with the detent 80 and holds the same in a depressed or inoperative position. It may be mentioned that when the detent 80 is in operative engagement with the lever 14 the clutch is held in an open position, although the clutch pedal 43' is still permitted to have the necessary movement back and forth to operate the cam 53 and control the brake band actuating mechanism of the planetary gear system. At all times, excepting when the gear shifting lever 71 is in a high speed position, the clutch will be locked open by engagement of the detent 80 with the lever 14, and when the clutch pedal 43' is pressed forwardly the selector element 64 can be shifted to any desired position upon the actuating element or guide bar 63, so that when the actuating element is returned to its original position upon the release of the clutch pedal, a selected one of the brake bands will be tightened, thereby setting the planetary gear system to transmit motion at the selected ratio of speed. The mechanism which has been shown will give three forward speeds and a reverse speed, and the conventional Ford mechanism, giving only two forward speeds and a reverse speed can be readily transformed into a transmission device embodying this invention.

Having thus described my invention what I claim as new and desire to secure by Letters Patent is:

1. In a variable speed transmission gearing, the combination with a driving member, of a driven member, a clutch connection, multiple speed planetary gearing between the members, selective means controlling the planetary gearing, and means acting independent of the selective means for automatically locking the clutch in an open position when the planetary gearing is in operation.

2. In a variable speed transmission gearing, the combination with a driving member, of a driven member, a clutch connection between the members, a multiple speed planetary gearing connection between the members, brake bands controlling the planetary gearing, an actuating member, a selector element adjustable upon the actuator for tightening any selected one of the brake bands, and means for automatically holding the clutch in an open position when the planetary gearing is in operation.

3. In a variable speed transmission gearing, the combination with a driving member, of a driven member, a clutch connection between the members, a multiple speed planetary gearing between the members, brake bands controlling the planetary gearing, an actuating member, means for moving the actuating member into inoperative position when the clutch is opened, a selector adjustable upon the actuating member and adapted to be positioned to tighten any selected one of the brake bands, and means for automatically locking the clutch in an open position when the selector is in position to tighten one of the brake bands.

4. In a variable speed transmission gearing, the combination with a driving member, of a driven member, a clutch connection between the members, a multiple speed planetary gearing between the members, brake bands controlling the planetary gearing, a yieldable actuating member, means for automatically moving the actuating member into inoperative position when the clutch is opened, a selector slidably mounted upon the actuating member and adapted to be positioned thereon for tightening any selected one of the brake bands, and means for automatically locking the clutch in an open position when the selector is adjusted to tighten one of the brake bands.

5. In a variable speed transmission gearing, the combination with a driving member, of a driven member, a clutch connection between the members, a multiple speed planetary gearing connection between the members, brake bands controlling the planetary gearing, detent means for locking the clutch in an open position, selective means for controlling the planetary gearing, and means associated with the selector means for holding the said clutch locking means in inoperative position when the said selector means is set for a direct drive between the driving member and the driven member.

6. In a variable speed transmission gearing, the combination with a driving member, of a driven member, a clutch connection between the members, a multiple speed planetary gearing between the members, detent means for locking the clutch in an open position, a slide selectively controlling the planetary gearing, and cam means carried by the slide for engaging the before mentioned detent means to hold the latter in inoperative position when the slide is positioned to render the planetary gearing inoperative and provide for a direct connection between the driving member and the driven member.

7. In a variable speed transmission gearing, the combination with a driving member, of a driven member, a clutch connection tween the members, a multiple speed planetary gearing between the members, means for locking the clutch in an open position, a selector controlling the planetary gearing, and cam means carried by the said selector for automatically rendering inoperative the means for holding the clutch in an open position when the said selector is positioned to render the planetary gearing inoperative to provide for a direct connection between the driving member and the driven member.

8. In a variable speed transmission gearing, the combination with a driving member, of a driven member, a clutch connection between the members, a multiple speed planetary gearing between the members, brake bands controlling the planetary gearing, an actuating member, a clutch pedal selectively connected with the clutch, means actuated by the clutch pedal for automatically moving the actuating member into inoperative position, a selector slidably mounted upon the actuating member and adapted to be positioned thereon to tighten any selected one of the brake bands for locking the clutch in an open position, and means for automatically rendering the said clutch locking means inoperative when the selecter is positioned to provide for a direct connection between the driving member and the driven member.

9. In a variable speed transmission gearing, the combination with a driving member, of a driven member, a clutch connection between the members, a multiple speed planetary gearing between the members, brake bands controlling the planetary gearing, an arm for each of the brake bands, a swinging actuating member, means for moving the actuating member into inoperative position when the clutch is open, a slide adjustable upon the actuating member for engagement with any selected one of the arms to tighten the corresponding brake band when the actuating member is released, and means for locking the clutch in an open position when the planetary gearing is in operative position.

10. In a variable speed transmission gearing, the combination with a driving member, of a driven member, a clutch connection between the members, a multiple speed planetary gearing between the members, brake bands controlling the planetary gearing, an arm for each of the brake bands, a shaft upon which the arms are mounted, an actuating member arranged parallel to the shaft and mounted to swing about the shaft as an axis, means for moving the actuating member into inoperative position when the clutch is open, a selector slidable upon the actuating member and adapted to be positioned to engage any selected one of the arms to tighten the corresponding brake band when the actuating member is released and returns to its original position, and means for automatically holding the clutch in an open position when the planetary gearing is in operation.

11. In a variable speed transmission gearing, the combination with a driving member, of a driven member, a clutch connection between the members, a multiple speed planetary gearing between the members, brake bands controlling the planetary gearing, operating arms for the brake bands, a shaft upon which the said arms are pivoted, an actuating member arranged parallel to the shaft and rigid therewith, means for rocking the shaft to swing the actuating member into inoperative position when the clutch is opened, a selector slidable upon the actuating member and adapted to be positioned thereon for engagement with any one of the arms to tighten the corresponding brake band when the actuating member is released and returns to its original position, and means for holding the clutch in an open position when the planetary gearing is in operation.

12. In a variable speed transmission gearing, the combination with a driving member, of a driven member, a clutch connection between the members, a multiple speed planetary gearing between the members, brake bands controlling the planetary gearing, operating arms for the brake bands, a shaft upon which the operating arms are pivoted, an actuating member rigid with the shaft and arranged parallel therewith, yielding means tending to rotate the shaft in one direction, means for automatically rotating the shaft in the other direction to swing the actuating member into inoperative position when the clutch is opened, a selector slidable upon the actuating member and adapted to be positioned to engage any selected one of the arms to tighten the corresponding brake band, and means for holding the clutch in an open position when the planetary gearing is in operation.

13. In a variable speed transmission gearing, the combination with a driving member, of a driven member, a clutch connection between the members, a multiple speed planetary gearing between the members, brake bands controlling the planetary gearing, operating arms for the brake bands, a shaft upon which the arms are pivoted, an actuating bar arranged parallel to the shaft and rigidly connected therewith, yielding means tending to rock the shaft in one direction, a pedal operatively connected with the clutch, cam means actuated by the pedal for rocking the shaft against the before mentioned yielding means when the clutch is opened, a selector slidable upon the actuating bar and adapted to be positioned to engage any selected one of the before mentioned arms to tighten the corresponding brake band, and means for holding the clutch in an open position when the planetary gearing is in operation.

14. In a variable speed transmission gearing, the combination with a driving member, of a driven member, a clutch connection between the members, a multiple speed planetary gearing between the members, brake bands controlling the planetary gearing, arms for the brake bands, a shaft upon which the arms are pivoted, an actuating bar rigid with the shaft and arranged parallel thereto, yielding means tending to rotate the shaft in one direction, means for rotating the shaft in the opposite direction when the clutch is opened, a selector slidable upon the actuating bar, a gear selecting lever operatively engaging the selector for moving the same into position to engage any selected one of the arms and tighten the corresponding brake band, and means for holding the clutch in an open position when the planetary gearing is in operation.

15. In a variable speed transmission gearing, the combination with a driving member, of a driven member, a clutch connection between the members, a multiple speed planetary gearing between the members, brake bands controlling the planetary gearing, arms for the respective brake bands, a shaft upon which the arms are pivotally mounted, an actuating bar arranged parallel to the shaft and rigidly connected therewith, a pair of arms rigid with the shaft, yielding means engaging one of the arms and normally tending to rotate the shaft in one direction, a cam engaging the other arm to rotate the shaft against the action of the spring, a clutch pedal selectively connected to the cam, a selector slidable upon the actuating bar and adapted to be positioned to engage a selected one of the arms to tighten the corresponding brake band, and means for holding the clutch in an open position when the plenetary gearing is in operation.

16. In a variable speed transmission gearing, the combination with a driving member, of a driven member, a clutch connection between the members, a multiple speed planetary gearing between the members, clutch control means including a lever, a clutch pedal operatively connected to the clutch control means, a detent adapted to engage the lever to lock the clutch in an open position, and selector means controlling the planetary gearing and provided with means for holding the said detent in an inoperative position when the planetary gearing is not in operation.

17. In a variable speed transmission gearing, the combination with a driving member, of a driven member, a clutch connection between the members, a multiple speed planetary gearing between the members, a shaft controlling the clutch, a lever rigid with the shaft, a detent arranged for engagement with the lever to lock the clutch in an open position, a clutch pedal operatively connected with the shaft, and gear selecting means movable when the clutch pedal is operated and provided with means for holding the detent in an inoperative position when the gear selecting means is adjusted to render the planetary gearing inoperative and provide for a direct connection between the driving member and the driven member.

18. In a variable speed transmission gearing, the combination with a driving member, of a driven member, a multiple speed planetary gearing between the members, brake bands controlling the planetary gearing, arms for the brake bands, a shaft upon which the arms are pivotally mounted, an actuating bar extending parallel to the shaft and adapted to be swung bodily about the shaft as an axis, and a selector slidable upon the actuating bar and adapted to be brought into position for cooperation with any selected one of the arms to tighten the corresponding brake band.

19. In a variable speed transmission gearing, the combination with a driving member, of a driven member, multiple speed planetary gearing between the members and including a plurality of drums, brake bands for the respective drums, a lever, a sliding selector movable by the lever, and means associated with the selector to rock the same for tightening any selected one of the brake bands, according to the position of the selector.

20. In a variable speed transmission gearing, the combination with a driving member, of a driven member, a multiple speed planetary gearing between the members and including a plurality of drums, brake bands for the respective drums, a shifting lever, a selector operatively engaged by the lever having a sliding movement, independent means for imparting a transverse movement to the selector, the sliding movement enabling the selector to be positioned for the tightening of any one of the brake bands and the lateral movement of the selector causing the said tightening of the brake band.

In testimony whereof I affix my signature.

JAMES H. WATSON.